(12) United States Patent
Hieronymus et al.

(10) Patent No.: US 8,572,935 B2
(45) Date of Patent: Nov. 5, 2013

(54) ASSEMBLAGE OF AND METHOD OF ASSEMBLING REAMS OF PAPER ON A PALLET

(75) Inventors: Robert P. Hieronymus, Marietta, GA (US); Sean T. Van Uum, Cumming, GA (US)

(73) Assignee: Georgia-Pacific Consumer Products LP, Atlanta, GA (US)

( * ) Notice: Subject to any disclaimer, the term of this patent is extended or adjusted under 35 U.S.C. 154(b) by 252 days.

(21) Appl. No.: 12/604,021

(22) Filed: Oct. 22, 2009

(65) Prior Publication Data

US 2010/0307943 A1    Dec. 9, 2010

Related U.S. Application Data

(60) Provisional application No. 61/184,555, filed on Jun. 5, 2009.

(51) Int. Cl.
  *B65B 35/50*    (2006.01)

(52) U.S. Cl.
  USPC .................. 53/531; 53/447; 53/540; 53/544; 53/443; 53/446

(58) Field of Classification Search
  USPC ........ 53/139.7, 157, 399, 410, 441, 443, 446, 53/447, 531, 540, 544, 556
  See application file for complete search history.

(56) References Cited

U.S. PATENT DOCUMENTS

| | | | |
|---|---|---|---|
| 3,055,573 A | 9/1962 | Carter | |
| 3,985,242 A | 10/1976 | Schlaeger | |
| 3,986,611 A * | 10/1976 | Dreher | 206/597 |
| 4,036,364 A | 7/1977 | Ambrose | |
| 4,068,765 A | 1/1978 | Pulda | |
| 4,079,566 A * | 3/1978 | Stoecklin | 53/399 |
| 4,201,138 A * | 5/1980 | Cox | 108/55.1 |
| 4,292,901 A | 10/1981 | Cox | |
| 4,365,710 A * | 12/1982 | Swanson | 206/386 |
| 4,793,490 A * | 12/1988 | Evert | 206/497 |

(Continued)

FOREIGN PATENT DOCUMENTS

| | | |
|---|---|---|
| DE | 10141964 A1 | 3/2003 |
| EP | 0799780 A2 | 10/1997 |

(Continued)

OTHER PUBLICATIONS

English Translation for JP2008189369 (A); Publication Date: Aug. 21, 2008; Title: "Transporting and Displaying Method of Paper Product"; Applicant: Nippon Paper Crecia Co. Ltd.; One page.

(Continued)

*Primary Examiner* — Alexandra Elve
*Assistant Examiner* — Eyamindae Jallow
(74) *Attorney, Agent, or Firm* — William W. Letson

(57) ABSTRACT

An assemblage of reams of paper includes a plurality of layers of reams of paper. The plurality of layers includes a first layer having a first arrangement of reams, a second layer having a second arrangement of reams disposed on top of the first layer, and a third layer having a third arrangement of reams disposed on top of the second layer. The second arrangement is different from the first arrangement so as to form interlocking first and second layers, and the third arrangement is different from the second arrangement, so as to form interlocking second and third layers.

14 Claims, 8 Drawing Sheets

(56) References Cited

U.S. PATENT DOCUMENTS

| | | | |
|---|---|---|---|
| 4,852,330 A * | 8/1989 | Carangelo | 53/399 |
| 4,913,290 A * | 4/1990 | deGroot | 206/597 |
| 5,255,841 A * | 10/1993 | Ritter | 229/103 |
| 5,370,233 A | 12/1994 | Schutz et al. | |
| D359,180 S | 6/1995 | Bedney | |
| 5,630,692 A | 5/1997 | Hanaya | |
| 5,647,191 A * | 7/1997 | Villemure | 53/447 |
| 5,725,089 A * | 3/1998 | Ravet et al. | 206/83.5 |
| 5,749,693 A | 5/1998 | Hanaya | |
| 5,844,807 A | 12/1998 | Anderson et al. | |
| 5,992,735 A | 11/1999 | Oosterbaan | |
| 6,012,587 A * | 1/2000 | McCullough | 206/586 |
| 6,041,570 A * | 3/2000 | Descalzo | 53/158 |
| 6,386,824 B1 | 5/2002 | Pizzi et al. | |
| 6,419,090 B1 | 7/2002 | Focke et al. | |
| D479,062 S | 9/2003 | Meyer | |
| 7,411,602 B2 * | 8/2008 | Stenzel et al. | 347/262 |
| 7,880,904 B2 * | 2/2011 | Stenzel et al. | 358/1.12 |
| 8,024,912 B2 * | 9/2011 | Macleod et al. | 53/433 |
| 2003/0150764 A1 | 8/2003 | Bevier | |
| 2004/0051328 A1 | 3/2004 | Cinotti et al. | |
| 2004/0124111 A1 | 7/2004 | Bevier | |
| 2005/0224731 A1 | 10/2005 | Hahn et al. | |
| 2006/0249565 A1 | 11/2006 | Wood et al. | |
| 2006/0272961 A1 | 12/2006 | Justice et al. | |
| 2009/0162181 A1 | 6/2009 | Ryf | |
| 2009/0277901 A1 * | 11/2009 | Port et al. | 220/9.4 |
| 2009/0288980 A1 | 11/2009 | Hadala | |
| 2010/0089781 A1 | 4/2010 | Van Uum et al. | |
| 2010/0092268 A1 | 4/2010 | Hieronymus et al. | |
| 2011/0062049 A1 * | 3/2011 | Deiger et al. | 206/557 |

FOREIGN PATENT DOCUMENTS

| | | | |
|---|---|---|---|
| EP | 0896945 A2 | 2/1999 | |
| JP | 3111213 A | 5/1991 | |
| JP | 6135511 A | 5/1994 | |
| JP | 2008189369 A | 8/2008 | |

OTHER PUBLICATIONS

English Translation for JP6135511 (A); Publication Date: May 17, 1994; Title: "Automatic Picking Methodn and Device for Stacked Sheet-Like Packing Body"; Applicant: Tokushu Seishi KK; One page.

English Translation for JP3111213 (A); Publication Date: May 13, 1991; Title: "Method for Packing Planographic Ream"; Applicant: Sanyo Kokusaku Pulp Co.; One page.

English Translation for EP0896945 (A2); Publication Date: Feb. 17, 1999; Title: "Device and Method for Stacking Batches of Paper"; Applicant: Bielomatik Leuze & Co. [DE]; One page.

English Translation for EP0799780 (A2); Publication Date: Oct. 8, 1997; Title: "Palletizing Device for Reams of Paper"; Applicant: Will E C H GMBH & Co. [DE]; One page.

English Translation for DE10141964 (A1); Publication Date: Mar. 20, 2003; Title: "Method for Forming Stacks From Reams of Paper on Pallet Comprises Feeding Them From Conveyor Belt of Adjustable Height, Bridge Being Placed Over Nearer Stack, Allowing Stacking in Further Position"; Applicant: Bielomatik Lueuze & Co. [DE]; One page.

Office Action for U.S. Appl. No. 12/603,998 Mailed Sep. 24, 2012.
Office Action for U.S. Appl. No. 12/608,163 Mailed Oct. 11, 2012.
Office Action for U.S. Appl. No. 12/603,998 mailed Jul. 9, 2010.
Final Office Action for U.S. Appl. No. 12/603,998 mailed Mar. 28, 2011.

* cited by examiner

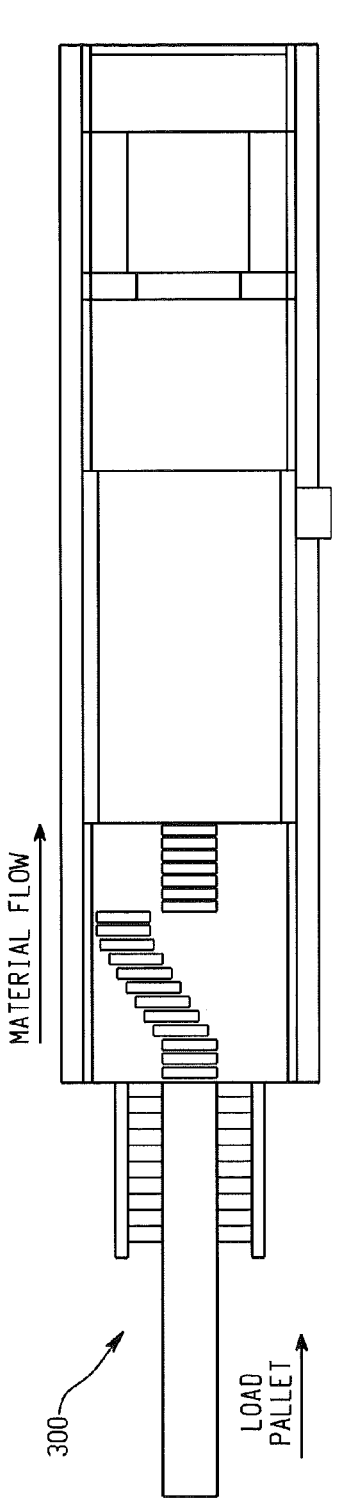
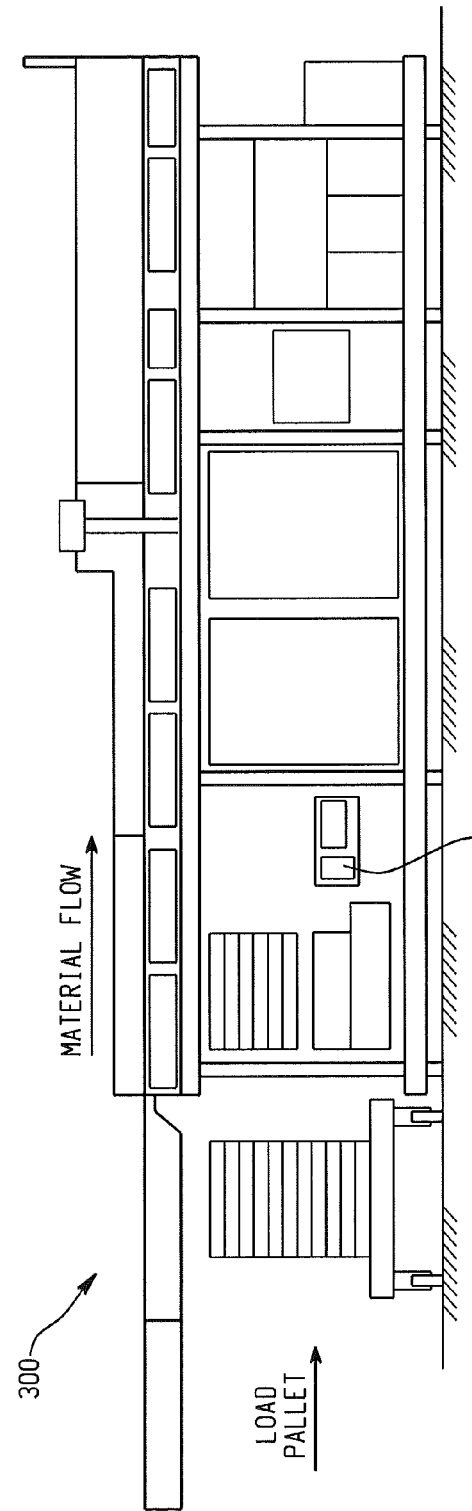

ASSEMBLAGE OF AND METHOD OF ASSEMBLING REAMS OF PAPER ON A PALLET

CROSS REFERENCE TO RELATED APPLICATIONS

This application claims the benefit of U.S. Provisional Application Ser. No. 61/184,555, filed 5 Jun. 2009, which is incorporated herein by reference in its entirety.

BACKGROUND OF THE INVENTION

The present disclosure relates generally to an assemblage of and method of assembling reams of paper, and particularly to an assemblage of and method of assembling reams of paper on a pallet.

Wooden pallets are highly utilized for transporting many types of product, which may then be stored at the receiving site for future processing, unloaded at the receiving site for display and/or storage in an alternative manner, or placed on a suitable shelf as-received for end-user viewing and purchase. With respect to transportation from the point-of-production to the point-of-sale of paper product useful for photocopying, printing, or the like, the paper is typically stacked in reams that are individually wrapped in a suitable film material that envelopes each ream, and then placed in suitably sized cardboard boxes for loading on a pallet via an automated palletizer. The cardboard boxes provide protection for the reams of paper during transportation and also provide increased rigidity to the stacked arrangement on a pallet. For 8.5-inch by 11-inch paper stacked in a cardboard box, a double stacked carton of reams has a footprint dimension of about 17.75-inches by 11.75-inches, which must then be placed on an industry standard shipping pallet, such as a GMA (Grocery Manufacturers of America) pallet having nominal dimensions of 40-inches by 48-inches. Due to the rigidity provided by the cardboard boxes, the boxed reams of paper are generally stacked in column form, which is suitable for some forms of transportation. The cardboard boxes, however, are typically only used for shipping and are generally discarded at the receiving site, and the extra thickness of the cardboard boxes adds to the overall size of the reams of paper that are to be palletized. As such, the cardboard boxes are seen to add waste to the shipping process and to interfere in optimizing the packing of a plurality of layers of reams of paper on an industry standard sized pallet. On the other hand, transporting a plurality of layers of reams of paper absent cardboard boxes may yield unstable pallets that are unsuitable for long-distance transportation. Accordingly, there is a need in the art for palletizing a plurality of layers of reams of paper in a more ecologically friendly manner that is also suitable for stable long distance transportation.

This background information is provided to reveal information believed by the applicant to be of possible relevance to the present invention. No admission is necessarily intended, nor should be construed, that any of the preceding information constitutes prior art against the present invention.

BRIEF DESCRIPTION OF THE INVENTION

An embodiment of the invention includes an assemblage of reams of paper having a plurality of layers of reams. The plurality of layers includes a first layer having a first arrangement of reams, a second layer having a second arrangement of reams disposed on top of the first layer, and a third layer having a third arrangement of reams disposed on top of the second layer. The second arrangement is different from the first arrangement so as to form interlocking first and second layers, and the third arrangement is different from the second arrangement, so as to form interlocking second and third layers.

Another embodiment of the invention includes a method of assembling a plurality of layers of reams of paper on a transportable support platform using a palletizer having a controller with a processing circuit responsive to executable instructions, which when executed by the processing circuit causes the palletizer to: assemble a first layer of reams of paper on top of the support platform, the first layer having a first arrangement of reams; assemble a second layer of reams of paper on top of the first layer, the second layer having a second arrangement of reams different from the first layer, forming interlocking first and second layers; and assemble a third layer of reams of paper on top of the second layer, the third layer having a third arrangement of reams different from the second layer, forming interlocking second and third layers.

Another embodiment of the invention includes an assemblage of reams of paper having a plurality of layers of reams of paper, the plurality of layers having a common reference frame defined by a plan view of a first layer of the plurality of layers having a lower left corner, an upper left corner, an upper right corner, and a lower right corner. The first layer includes a first group of reams of paper disposed in the lower left corner, a second group of reams of paper disposed in the upper left corner, a third group of reams of paper disposed in the upper right corner, and a fourth group of reams of paper disposed in the lower right corner. At least one of the first group, the second group, the third group, and the fourth group has an arrangement of reams of paper different from the other groups with respect to configuration and/or orientation of the respective reams.

Another embodiment of the invention includes an assemblage of reams of paper having a plurality of layers of reams of paper arranged in an alternating fashion such that a first of the layers has an arrangement of reams different from a second of the layers, a third of the layers is arranged identical to the first layer, and a fourth of the layers is arranged identical to the second layer, the first, second, third and fourth layers being arranged in consecutive order one on top of the other.

Another embodiment of the invention includes a method of assembling reams of paper forming an assemblage, the assemblage having a plurality of layers of reams of paper with a common reference frame defined by a plan view of a first layer of the plurality of layers having a lower left corner, an upper left corner, an upper right corner, and a lower right corner. The first layer of the plurality of layers is arranged such that a first group of reams of paper is disposed in the lower left corner, a second group of reams of paper is disposed in the upper left corner, a third group of reams of paper is disposed in the upper right corner, and a fourth group of reams of paper is disposed in the lower right corner. At least one of the first group, the second group, the third group, and the fourth group has an arrangement of reams of paper arranged different from the other groups with respect to configuration and/or orientation of the respective reams.

Another embodiment of the invention includes a method of assembling an assemblage of reams of paper. A plurality of layers of reams of paper is arranged in an alternating fashion such that a first of the layers has an arrangement of reams different from a second of the layers, a third of the layers is arranged identical to the first layer, and a fourth of the layers is arranged identical to the second layer, the first, second, third and fourth layers being arranged in consecutive order one on top of the other.

BRIEF DESCRIPTION OF THE DRAWINGS

Referring to the exemplary drawings wherein like elements are numbered alike in the accompanying Figures:

FIGS. 7A and 7B depict a top view and a side view in schematic block diagram form of a palletizer useful for practicing a method in accordance with an embodiment of the invention.

DETAILED DESCRIPTION OF THE INVENTION

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

An embodiment of the invention, as shown and described by the various figures and accompanying text, provides an assemblage of a plurality of layers of reams of paper on a pallet, with each layer being interlocked with an adjacent layer, and with the outer footprint of the assemblage being disposed on the pallet so as to minimize the underhang of the assemblage on the pallet, thereby providing an assemblage of reams of paper on a pallet having improved stability and transportability with respect to other prior art assemblages of reams of paper. While embodiments described herein depict a ream of paper made from paper sheets having specific nominal dimensions, such as 8.5-inches by 11-inches, for example, it will be appreciated that the disclosed invention is not so limited, and is also applicable to other paper sheets having other nominal dimensions, such as 11-inches by 17-inches, or A-size, for example.

Figure 1:
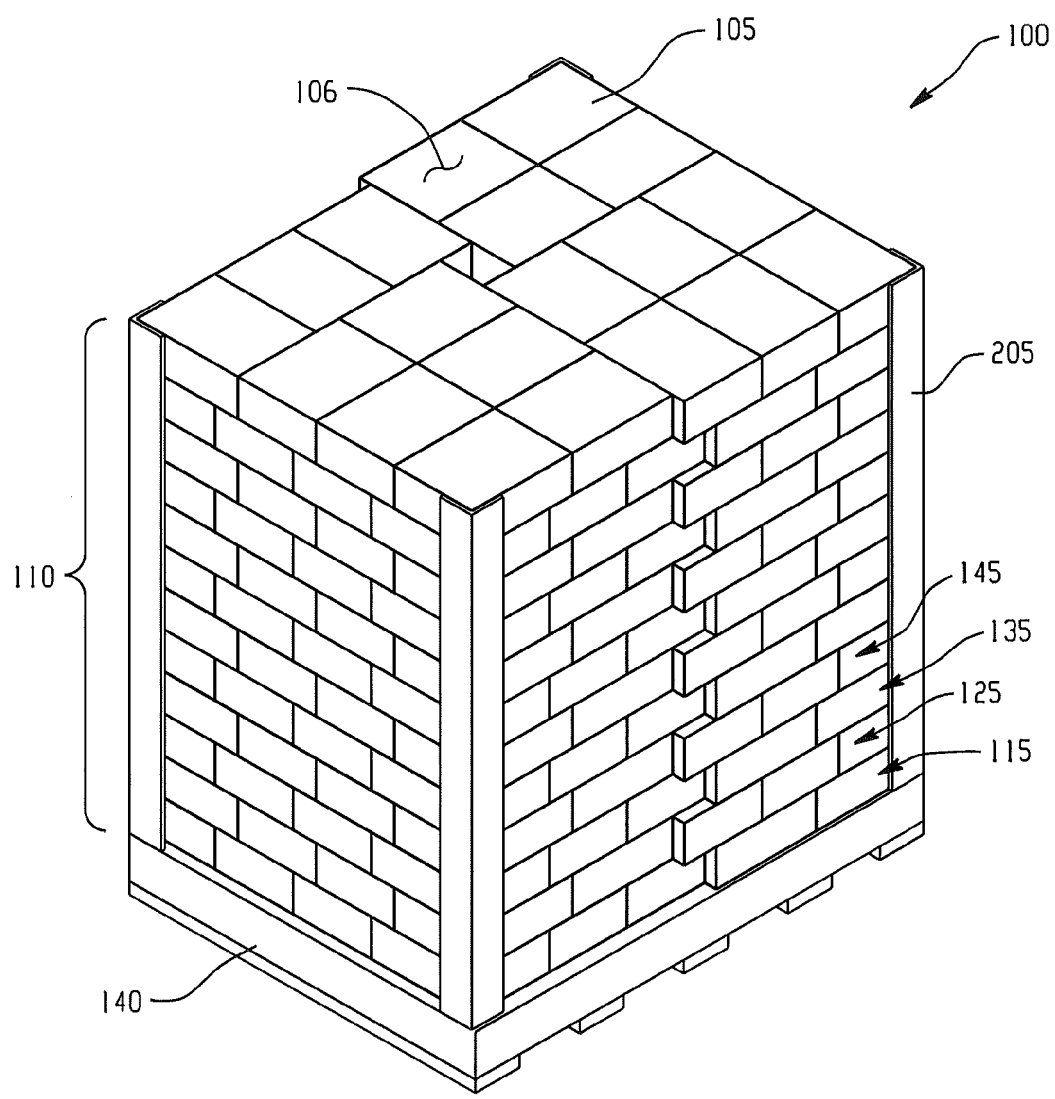
FIG. 1 depicts an example arrangement of a plurality of layers of reams of paper on a pallet in accordance with an embodiment of the invention.

FIG. 1 is an example embodiment of an assemblage 100 of reams of paper 105 disposed upon a pallet 140, which is also herein referred to as a transportable support platform. In an embodiment, the pallet 140 is a GMA (Grocery Manufacturers of America) pallet having industry standard nominal footprint dimensions of 40-inches by 48-inches, also known as a GMA Block pallet, which is an industry standard for pallets used in North American grocery and retail stores and warehouses. Another industry standard pallet is referred to as a Business to Business Block Pallet or Stringer Pallet of approximately 47-inches by 35.5-inches or 47.5-inches by 35.5-inches (herein also referred to as the B2B pallet). While embodiments of the invention are described herein with reference to a GMA pallet, it will be appreciated that the scope is not so limited, and that the invention also extends to other pallets such as a B2B pallet when used to practice embodiments of the invention disclosed herein.

The assemblage 100 includes a plurality of layers 110 of reams of paper 105, including a first layer 115 having a first arrangement 120 of reams (best seen by referring to FIG. 2), a second layer 125 having a second arrangement 130 of reams (best seen by referring to FIG. 3) disposed on top of the first layer 115, a third layer 135 having a third arrangement of reams disposed on top of the second layer 125, and a fourth layer 145 having a fourth arrangement of reams disposed on top of the third layer 135. In an embodiment, the second arrangement 130 is different from the first arrangement 120 so as to form interlocking first and second layers 115, 125 (best seen with reference to FIG. 1). Likewise, an embodiment has the third arrangement being different from the second arrangement (130), so as to form interlocking second and third layers 125, 135, and the fourth arrangement being different from the third arrangement, so as to form interlocking third and fourth layers 135, 145. As used herein, consistent with the various illustrations provided herein, the term interlocking layers refers to an arrangement of layers where: (i) adjacent layers have their respective plan view outlines arranged differently with respect to each other; or, (ii) reams of paper 105 in adjacent layers are not stacked in a tower fashion one on top of the other with perimeter edges aligned, but rather are stacked in a staggered fashion with perimeter edges misaligned. In an embodiment, the second arrangement 130 is a mirror image (flipped over 180-degrees) of the first arrangement 120, which can be seen by comparing FIG. 3 to FIG. 2. In an embodiment, the third arrangement (third layer 135) is the same as the first arrangement 120 (first layer 115), and the fourth arrangement (fourth layer 145) is the same as the second arrangement 130 (second layer 125) (best seen by the repetitive nature of layers illustrated in FIG. 1). In an embodiment, and as illustrated in FIG. 1, odd numbered layers of the plurality of layers, 115 and 135 for example, have the first arrangement 120, and even numbered layers of the plurality of layers, 125 and 145 for example, have the second arrangement 130. From the foregoing it will be appreciated that an embodiment includes a plurality of layers 110 of reams of paper 105, that is, first, second, third and fourth layers 115, 125, 135, 145 arranged in consecutive order one on top of the other, where the reams 105 are arranged in an alternating fashion such that the first layer 115 has an arrangement of reams 105 different from the second layer 125, the third layer 135 has an arrangement identical to the first layer 115, and the fourth layer 145 has an arrangement identical to the second layer 125.

Figure 4B:
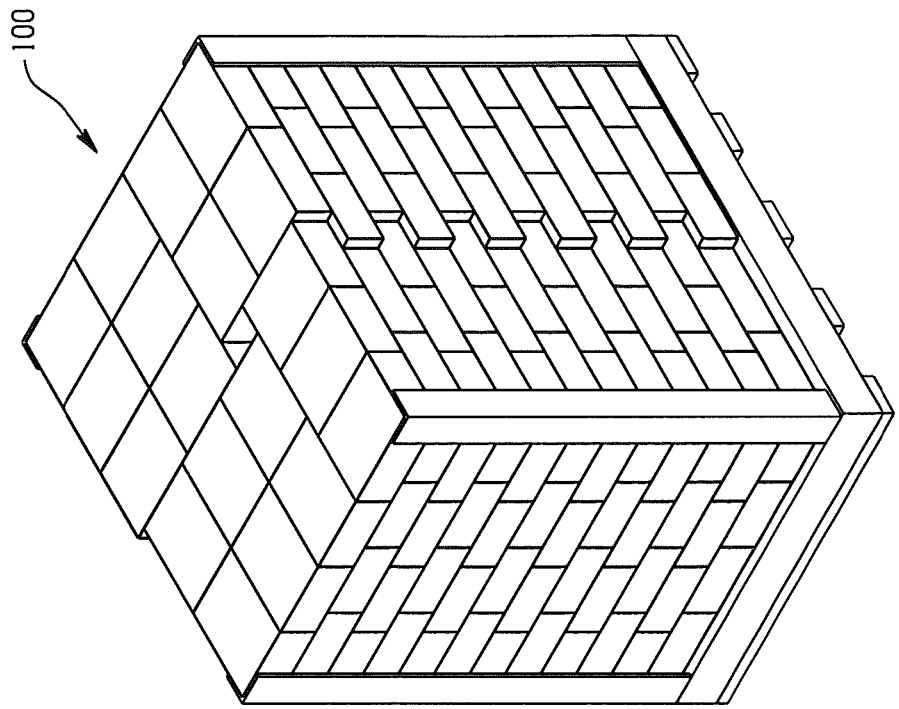
FIGS. 4A, B, C, D, E and F each depict example alternative arrangements to that of FIG. 1, all in accordance with an embodiment of the invention.
Figure 4A:
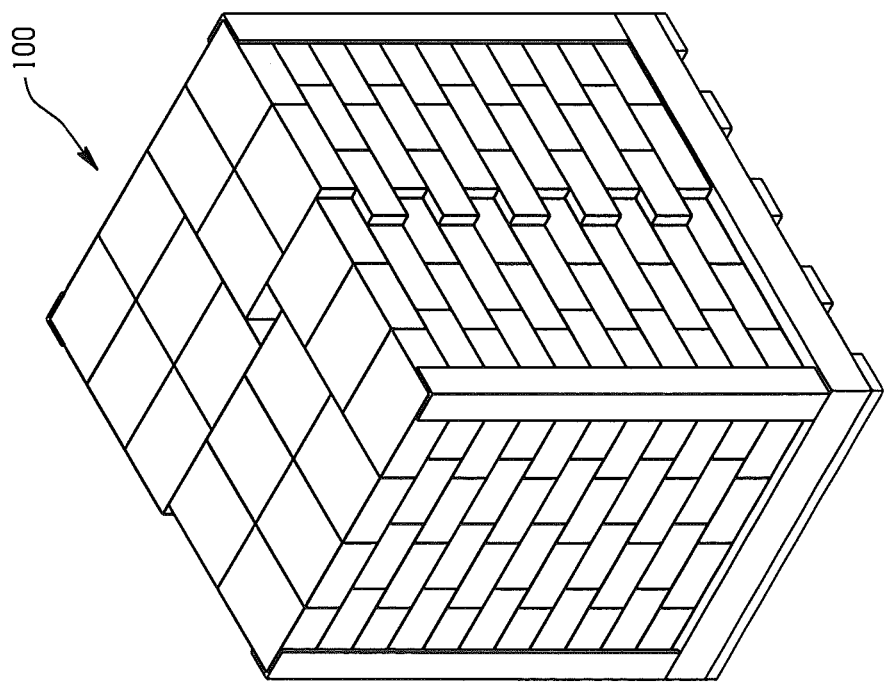
Figure 4D:
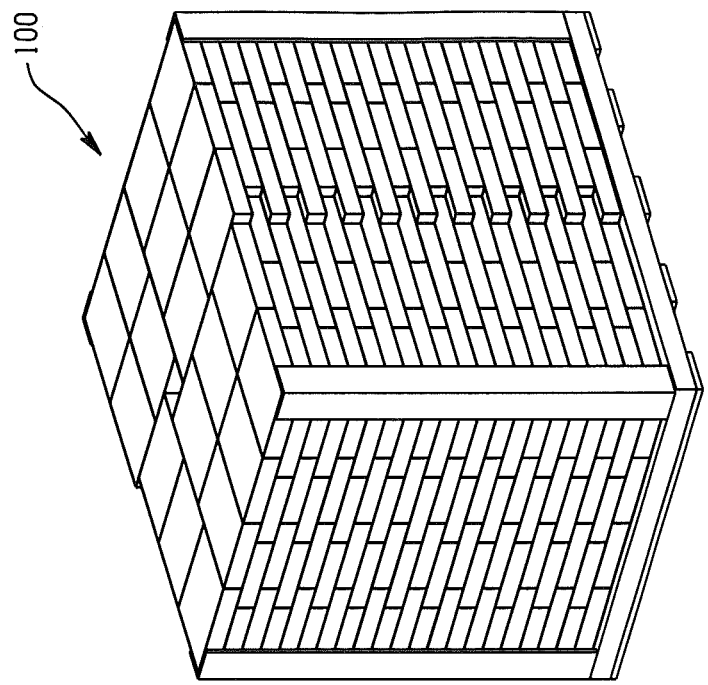
Figure 4C:
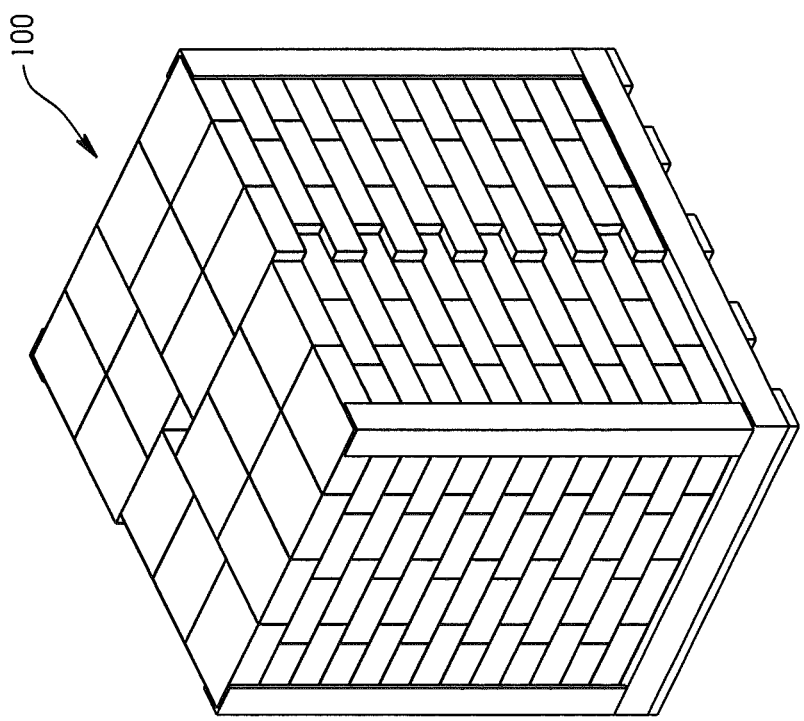

The embodiment of FIG. 1 depicts a plurality of layers 110 having a count of twelve layers, however, the invention is not limited to only twelve layers, and may encompass any number of layers suitable for the purposes disclosed herein (economical and stable transportation of reams of paper for example). For example, an embodiment of the invention may include an assemblage 100 having eleven, twelve, thirteen, twenty-one, twenty-two, or twenty-three layers (see FIGS. 4A, B, C, D, E and F for example), with an example embodiment having more than ten layers. For example, reams of paper sized as 24#800-count may be palletized in eleven layers (FIG. 4A) or twelve layers (FIG. 4B), reams of paper sized as 24#750-count may be palletized in twelve layers (FIG. 4B) or thirteen layers (FIG. 4C), reams of paper sized as 20#500-count may be palletized in twenty-one layers (FIG.

Figure 4F:
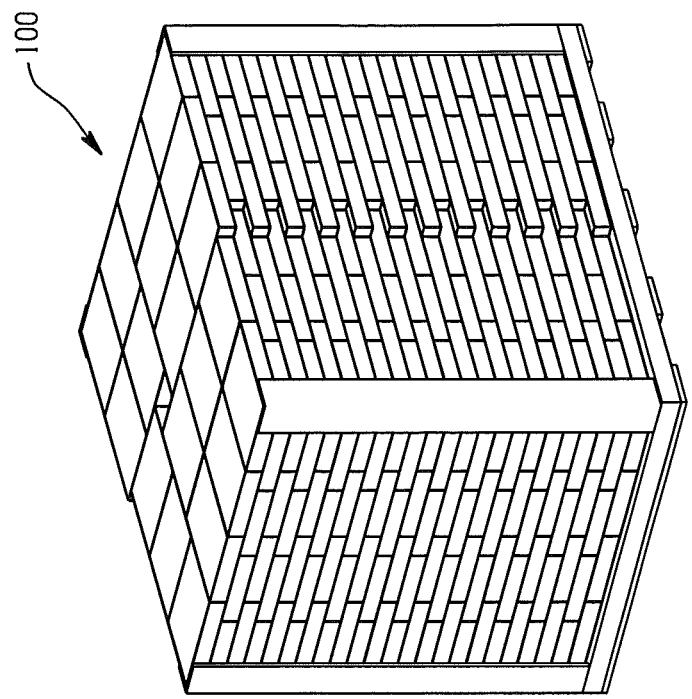
Figure 4E:
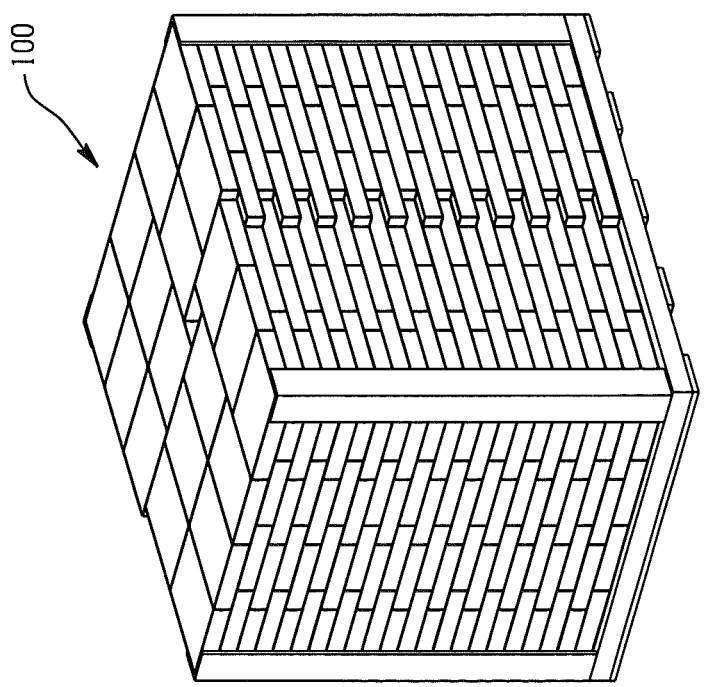

4D), reams of paper sized as 20#500-count or 24#500-count may be palletized in twenty-two layers (FIG. 4E), and reams of paper sized as 24#500-count may be palletized in twenty-three layers (FIG. 4F). Each ream of paper 105 is covered by a film material 106 (see FIG. 1 for example) that envelopes the respective ream of paper disposed therein, thereby fully containing the respective ream paper. An example film material 106 is Krystal-Ice Wrap, available from Coating Excellence International, Wrightstown, Wis. While the foregoing examples describe a certain weight/poundage (#) and quantity (count) of paper sheets per ream, it will be appreciated that the scope of the invention is not limited to only these examples, and also encompasses other weights and counts suitable for the purposes disclosed herein. In the foregoing examples, the paper size of each ream is 8.5-inches by 11-inches.

With reference back to FIGS. 1 and 2, the first layer 115 has a first arrangement 120 of reams of paper 105 formed by a first group 150 of reams 105 disposed in the lower left corner, a second group 155 of reams 105 disposed in the upper left corner, a third group 160 of reams 105 disposed in the upper right corner, and a fourth group 165 of reams 105 disposed in the lower right corner. As used herein, the terms "lower left corner", "upper left corner", "upper right corner" and "lower right corner" refer to the plan view of the first layer 115 as illustrated by the first arrangement 120 of FIG. 2, which is used to establish a common reference frame between all plurality of layers 110 in the assemblage 100. As can be seen from FIG. 2 (orientation as depicted on the page), an example assemblage 100 includes the first group 150 being arranged in 2-rows by 2-columns, the second group 155 being arranged in 2-rows by 3-columns, the third group 160 being arranged in 3-rows by 2-columns, and the fourth group 165 being arranged in 1-row by 3-columns. Furthermore, it can be seen from FIG. 2 that the first group 150 has its length (11-inch dimension, for example) oriented parallel with the length of the pallet 140 (48-inch dimension, for example), the second group 155 has its length oriented perpendicular to the length of the pallet 140, the third group 160 has its length oriented parallel with the length of the pallet 140, and the fourth group 165 has its length oriented perpendicular to the length of the pallet 140. As such, each group has an arrangement of reams of paper 105 different from each other group with respect to configuration (number of rows by number of columns) and/or orientation (paper length parallel with or perpendicular to pallet length). More generally, at least one of the first group 150, the second group 155, the third group 160, and the fourth group 165 has an arrangement of reams of paper 105 different from the other groups with respect to configuration and/or orientation of the respective reams 105. That is, the second layer 125 may have a fifth group of reams of paper 105 disposed in the lower left corner, a sixth group of reams of paper 105 disposed in the upper left corner, a seventh group of reams of paper 105 disposed in the upper right corner, and an eighth group of reams of paper 105 disposed in the lower right corner, where the fifth, sixth, seventh and eighth groups are different from the respective first, second, third and fourth groups 150, 155, 160, 165 with respect to configuration and/or orientation of the respective reams 105. In the embodiment depicted by FIGS. 2 and 3 (mirror images), the fifth group is the same as the second group 155, the sixth group is the same as the first group 150, the seventh group is the same as the fourth group 165, and the eighth group is the same as the third group 160, thereby resulting in the second layer 125 having a second group 155 of reams of paper 105 disposed in the lower left corner, a first group 150 of reams of paper 105 disposed in the upper left corner, the fourth group 165 of reams of paper 105 disposed in the upper right corner, and the third group 160 of reams of paper 105 disposed in the lower right corner.

Figure 2:
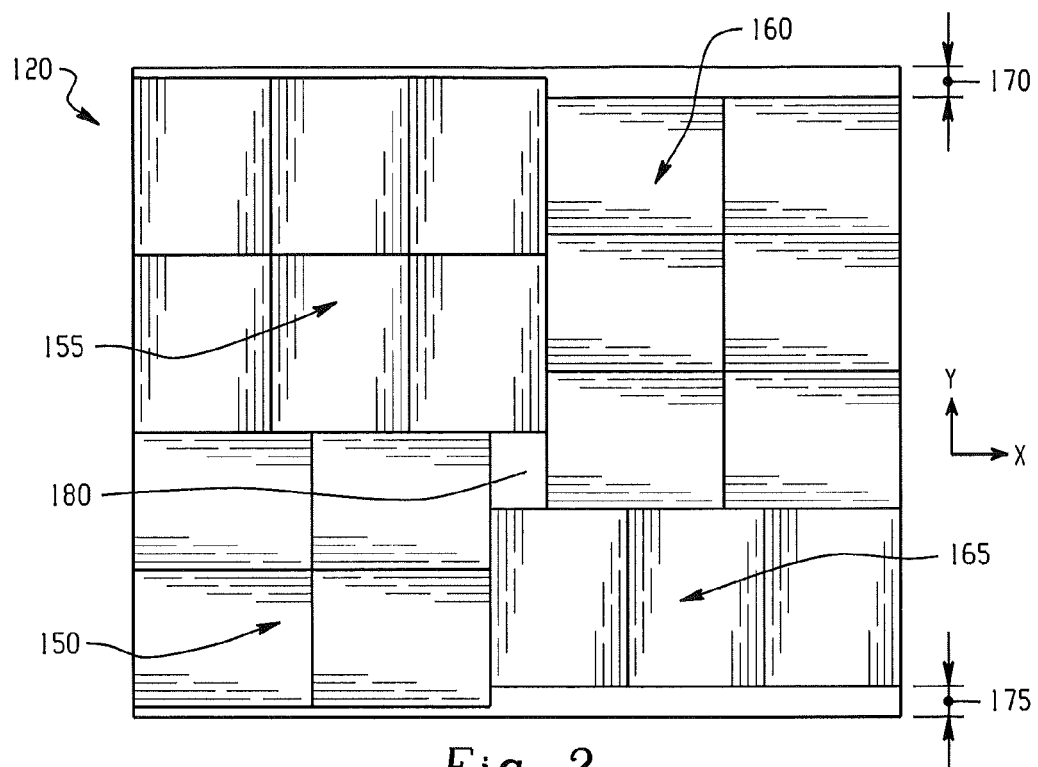
FIG. 2 depicts an example plan view of a first layer of the arrangement of FIG. 1 in accordance with an embodiment of the invention.
Figure 3:
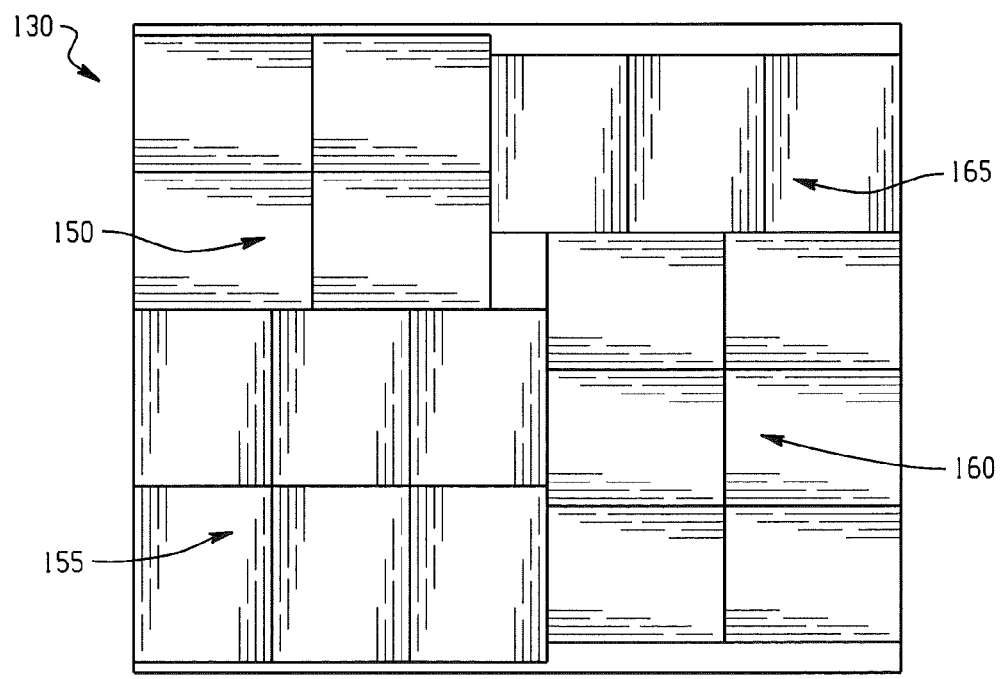
FIG. 3 depicts an example plan view of a second layer of the arrangement of FIG. 1 in accordance with an embodiment of the invention.

From the foregoing, and with reference now to FIG. 2, it will be appreciated that the first arrangement 120 having different groups of reams with different configurations and/or orientations will produce an outside footprint that is not a perfect rectangle (the outside footprint having a stepped profile), as evidenced by the first underhang dimension 170 associated with the third group 160, the second underhang dimension 175 associated with the fourth group 165, and the void 180 generally central to all four groups. In the embodiment depicted in FIG. 2 (40-inch wide pallet with 8.5-inch by 11-inch reams of paper, for example), each underhang dimension 170, 175 calculates to be about 1.75-inches, but only along a portion of the length of the pallet 140. Additionally in an embodiment, the footprint area of the first arrangement 120 (excluding the void 180) calculates to be about 1,776.5-square-inches (19 reams times 8.5-inches by 11-inches), which is about 92.53%, or nominally 93%, of the footprint area of the pallet 140 (40-inches by 48-inches, or 1,920-square-inches). As such, the first arrangement 120 of reams of paper 105, and consequently the mirror image second arrangement 130, has a footprint with an area of coverage that is greater than 85% of the pallet footprint area, and in an embodiment is about 93% of the pallet footprint area. Relative to a ratio of areas, the percentage of underhang of the example embodiment described above would be about 7%. However, as can be seen by reference to FIG. 2, the underhang is more pronounced on the sides of third and fourth groups 160, 165 and less pronounced on the sides of first and second groups 150, 155. Applying the example nominal dimensions discussed above for 8.5-inch by 11-inch reams of paper on a GMA pallet, the 1.75-inch underhangs 170, 175 each equate to about 4% underhang (1.75/40). Thus, and relative to a ratio of dimensions, the average percentage of underhang of the example embodiment described above would be about 4% on each side of the pallet 140, but over only a portion of the length of the pallet 140. More specifically, and relative to the same example embodiment discussed above, the dimension across first and fourth groups 150, 165 in the X-direction is nominally 47.5-inches, the dimension across second and third groups 155, 160 in the X-direction is nominally 47.5-inches, the dimension across first and second groups 150, 155 in the Y-direction is 39-inches, and the dimension across third and fourth groups 160, 165 is 36.5-inches. As such, and relative to a ratio of dimensions, the average percent underhang on the left and right sides of the pallet 140 is about 0.5% (0.25/48), and the average percent underhang on the top and bottom sides of the pallet 140 is about 1% (0.5/40) on the left side, and about 4% (1.75/40) on the right side as discussed above. By maximizing the footprint area and minimizing the underhang of the assemblage 100 of reams 105 of paper on a pallet 140, a more stable arrangement of reams 105 on a pallet 140 can be achieved. As can be seen from the example embodiment described herein, minimizing the underhang over only a portion of the length of the pallet 140 will still be effective in preventing undesirable shifting of the assemblage 100 during transportation.

With regard to footprint, it will be appreciated from the foregoing discussions relating to the second arrangement 130 being a mirror image of the first arrangement 120, and the first arrangement 120 having a stepped footprint profile, that the second arrangement 130 will have a stepped footprint profile that is a mirror image of the stepped footprint profile of the first arrangement 120.

Figure 5:
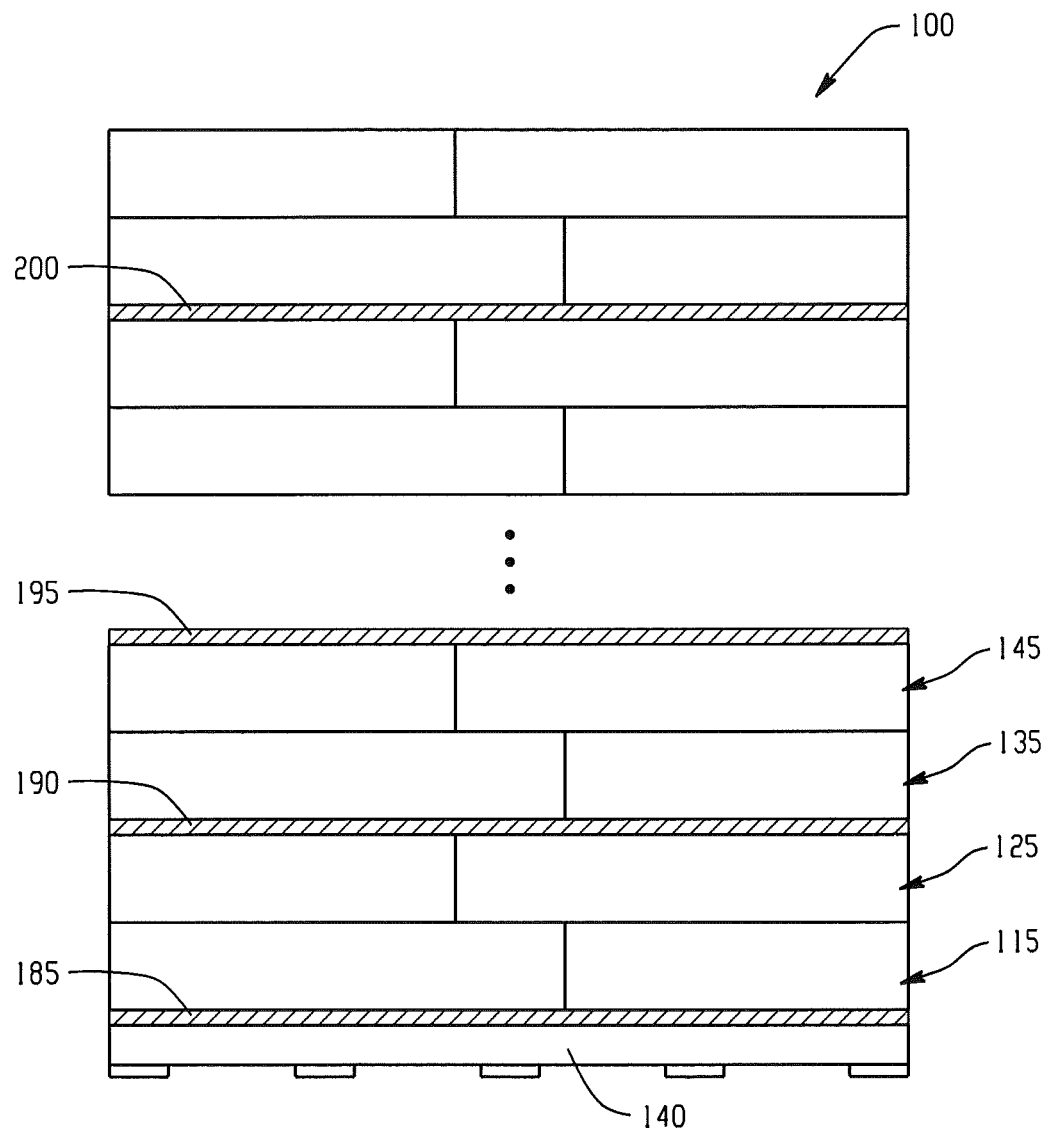
FIG. 5 depicts an example side view of a plurality of layers of reams of paper on a pallet having slip sheets placed in accordance with an embodiment of the invention.
Figure 6:
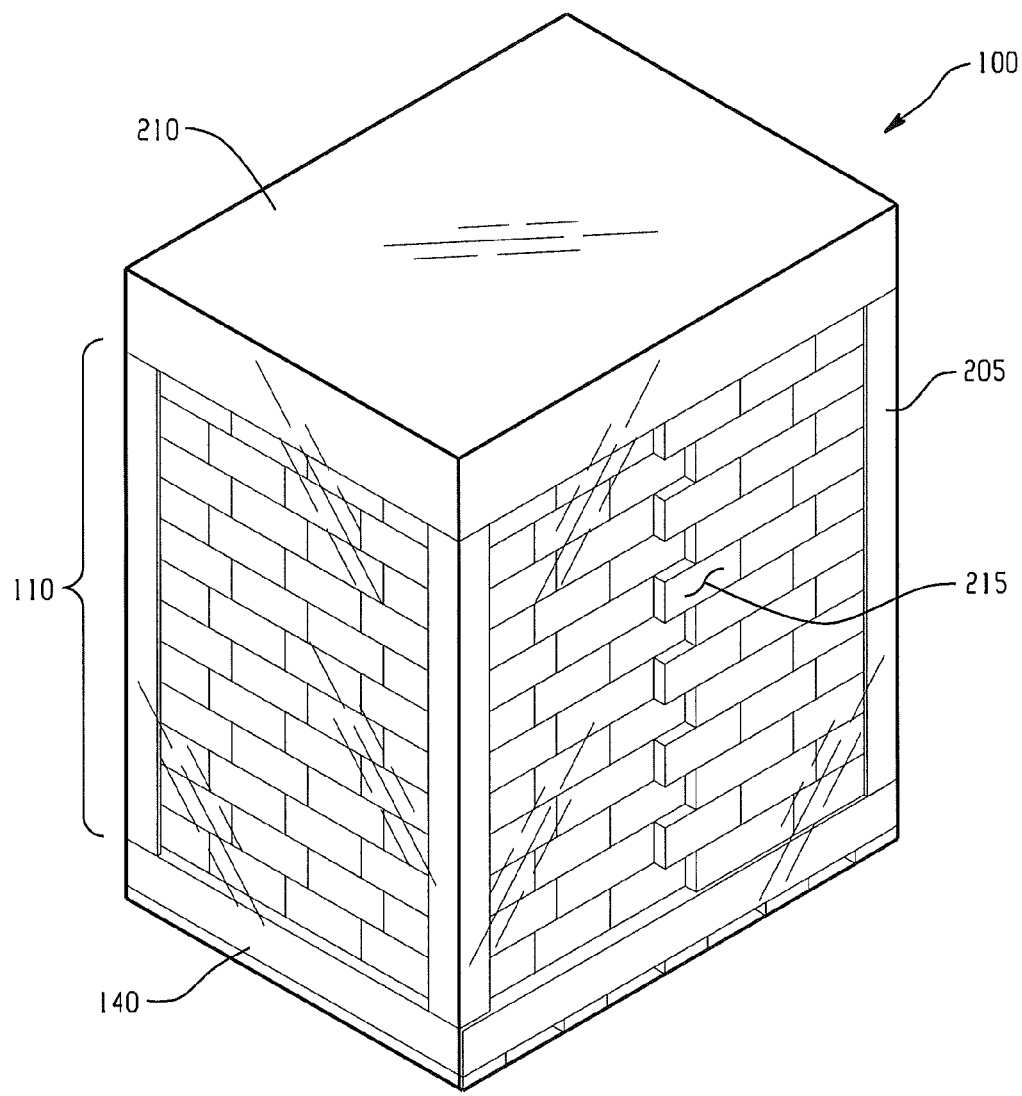
FIG. 6 depicts an arrangement similar to that of FIG. 1 with corner boards, a top cap, and stretch wrapping, all arranged in accordance with an embodiment of the invention.

Referring now to FIGS. 1, 5 and 6, an embodiment includes a first slip sheet 185 disposed between the first layer 115 and the pallet 140. In addition to the first slip sheet 185, another embodiment includes a plurality of slip sheets 190, 195, 200 with each one of the plurality of slip sheets being disposed between every two layers of the plurality of layers 110 of reams of paper 105. In an embodiment, only a second slip sheet, one of 190, 195 and 200, is disposed between an adjacent pair of layers of the plurality of layers 110 of reams of paper 105. The slip sheets, which may or may not be corrugated, serve to protect the reams of paper 105 from abrasion and prevent slippage during transport.

In an embodiment, the plurality of layers 110 forming the assemblage 100 are so disposed as to define four outer corners having four vertical edges extending from a lower most layer to an upper most layer, upon which a corner board 205 is disposed along each of the four edges. In an embodiment, a top cap 210 is disposed on top of the upper most layer. In yet another embodiment, a stretchable film material 215 is wrapped in a plurality of continuous layers around at least four sides of the assemblage 100, and in an embodiment is wrapped in a plurality of continuous layers around all six sides of the assemblage 100 in a pinwheel fashion. An example material used for the corner board 205 is Light Duty Edge Protector Model No. S-3857, available from ULINE, Waukegan, Ill. An example equipment used for placing the corner boards 205 is Model No. S-3500 with Cornerboard Placer, available from Lantech, Louisville, Ky. An example material used for the top cap 210 is Bulk Cargo Cover Model No. S-4480T, available from ULINE, Waukegan, Ill. An example material used for the stretchable film material 215 is PalleTech® Ultra Performance Stretch Film, available from Berry Plastics Corporation, Minneapolis, Minn. An example equipment used for wrapping the stretchable film material 215 is the S-1550/S-2500 Automatic Straddle Stretch Wrapping System, available from Lantech, Louisville, Ky.

From the foregoing, it will be appreciated that the scope of the invention not only encompasses structure of the assemblage 100 of reams of paper 105, but also encompasses a method of forming the assemblage 100, or more specifically, and with reference now to FIG. 7, a method of assembling a plurality of layers of reams of paper 110 on a transportable support platform 140 using a palletizer 300 comprising a controller 305 having a processing circuit 310 responsive to executable instructions which when executed by the processing circuit causes the palletizer 300 to form the assemblage 100 as herein fully described above. An example palletizer 300 useful for the purposes disclosed herein is contemplated to be available from Alvey, an FKI Logistex Company, St. Louis, Mo. However, the specific executable instructions suitable for practicing embodiments of the claimed invention is considered within the ambit of the disclosed invention herein, which discloses an end arrangement of reams of paper 105 on a pallet 140 having desired layers suitable for the purposes disclosed herein.

In an embodiment, a slip sheet 185 is assembled on top of the pallet 140 prior to assembling the first layer 115 on top thereof. Another slip sheet 185 may be assembled on top of the second layer 125 prior to assembling the third layer 135, and on top of every other subsequent layer prior to assembling a next layer on top thereof, as discussed above. Also as discussed above, after assembling a final one of the plurality of layers 110 of reams of paper 105, corner boards 205 may be placed at each one of four corners around the perimeter of the assemblage 100, a top cap 210 may or may not be assembled on top of the upper most layer, and a stretchable film material 215 may be wrapped in a plurality of continuous layers around at least four sides of the assemblage 100, or alternatively the stretchable film material 215 may be wrapped in a plurality of continuous layers around six sides of the assemblage 100.

As disclosed herein, an embodiment of the invention may be embodied in the form of computer-implemented processes and apparatuses for practicing those processes. The present invention may also be embodied in the form of a computer program product having computer program code containing instructions embodied in tangible media, such as floppy diskettes, CD-ROMs, hard drives, USB (universal serial bus) drives, or any other computer readable storage medium, such as random access memory (RAM), read only memory (ROM), or erasable programmable read only memory (EPROM), for example, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to arrange reams of paper on a pallet, absent boxed enclosures containing sets of reams, for economical and stable transportation.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. An assemblage of reams of paper, comprising:
   a first layer of reams of paper having a first arrangement; and
   a second layer of reams of paper having a second arrangement, the second layer disposed directly on the first layer, wherein:
   the second arrangement is different from the first arrangement;
   the first layer has a first footprint having at least one stepped profile and the second layer has a second footprint having at least one stepped profile, the second footprint being a mirror image of the first footprint so when the first layer and the second layer are stacked, the resulting stack has alternating underhangs.

2. The assemblage of claim 1, further comprising:
a transportable support platform having a platform footprint with a platform footprint area;
wherein the first and second layers are disposed on top of and supported by the platform;
wherein the first footprint has an overall area that is greater than 85% of the platform footprint area.

3. The assemblage of claim 2, wherein the area of the first footprint relative to the area of the platform footprint produces an underhang, in terms of ratio of areas, that is less than about 15%.

4. The assemblage of claim 2, wherein the first footprint has an overall area of about 93% of the platform footprint area.

5. The assemblage of claim 4, wherein the area of the first footprint relative to the area of the platform footprint produces an underhang, in terms of ratio of areas, of about 7%.

6. The assemblage of claim 2, wherein the transportable support platform is a pallet having a platform footprint with nominal dimensions of 40-inches by 48-inches, and wherein each ream of paper is formed using paper sheets having nominal dimensions of 8.5-inches by 11-inches.

7. An assemblage of reams of paper, comprising:
a plurality of layers of reams of paper comprising a first layer having a first arrangement of reams of paper, a second layer having a second arrangement of reams of paper disposed on top of the first layer, and a third layer having a third arrangement of reams of paper disposed on top of the second layer;
wherein the second arrangement is different from the first arrangement so as to form interlocking first and second layers;
wherein the third arrangement is different from the second arrangement, so as to form interlocking second and third layers;
wherein the first layer has a first footprint, and the second layer has a second footprint, the second footprint being a mirror image of the first footprint;
wherein each of the plurality of layers of reams of paper comprises a height of a single ream of paper;
wherein the first layer has a first footprint having a minimum dimension in the X-direction and a minimum dimension in the Y-direction, and further comprising:
a transportable support platform having a maximum dimension in the X-direction and a maximum dimension in the Y-direction;
wherein the plurality of layers are disposed on top of and supported by the platform;
wherein an average X-underhang is defined by one-half the ratio of the minimum dimension of the first footprint in the X-direction to the maximum dimension of the platform in the X-direction, and an average Y-underhang is defined by one-half the ratio of the minimum dimension of the first footprint in the Y-direction to the maximum dimension of the platform in the Y-direction;
wherein each of the average X-underhang and the average Y-underhang is no more than about 4%, thereby defining a maximum underhang.

8. The assemblage of claim 7, wherein the maximum underhang is only along a portion of a side of the platform and does not extend along the respective entire side of the platform.

9. An assemblage of reams of paper, comprising:
a plurality of layers of reams of paper arranged in an alternating fashion such that a first of the layers has an arrangement of reams different from a second of the layers, a third of the layers is arranged identical to the first layer, and a fourth of the layers is arranged identical to the second layer, wherein the first, second, third and fourth layers are arranged in consecutive order one on top of the other and;
wherein the first layer has a first footprint having at least one stepped profile and the second layer has a second footprint having at least one stepped profile, the second footprint being a mirror image of the first footprint so when the first layer and the second layer are stacked, the resulting stack has alternating underhangs.

10. The assemblage of claim 9, wherein, a relative to a common reference frame defined by a plan view of the first layer having a lower left corner, an upper left corner, an upper right corner, and a lower right corner:
the first layer comprises a first group of reams of paper disposed in the lower left corner, a second group of reams of paper disposed in the upper left corner, a third group of reams of paper disposed in the upper right corner, and a fourth group of reams of paper disposed in the lower right corner;
at least one of the first group, the second group, the third group, and the fourth group has an arrangement of reams of paper different from the other groups of reams of paper; and
the second layer comprises the second group of reams of paper disposed in the lower left corner, the first group of reams of paper disposed in the upper left corner, the fourth group of reams of paper disposed in the upper right corner, and the third group of reams of paper disposed in the lower right corner.

11. The assemblage of claim 10, wherein the first group, the second group, the third group, and the fourth group are all different arrangements as compared to each other with respect to configuration and/or orientation of the respective reams, and further comprising:
a transportable support platform;
wherein the plurality of layers are disposed on top of and supported by the platform.

12. A method of assembling an assemblage of reams of paper, comprising:
arranging a plurality of layers of reams of paper in an alternating fashion such that a first of the layers has an arrangement of reams different from a second of the layers, a third of the layers is arranged identical to the first layer, and a fourth of the layers is arranged identical to the second layer, wherein the first, second, third and fourth layers are arranged in consecutive order one on top of the other; and
wherein the first layer has a first footprint having at least one stepped profile and the second layer has a second footprint having at least one stepped profile, the second footprint being a mirror image of the first footprint so when the first layer and the second layer are stacked, the resulting stack has alternating underhangs.

13. The method of claim 12, wherein, and relative to a common reference frame defined by a plan view of the first layer having a lower left corner, an upper left corner, an upper right corner, and a lower right corner:
arranging the first layer to comprise a first group of reams of paper disposed in the lower left corner, a second group of reams of paper disposed in the upper left corner, a third group of reams of paper disposed in the upper right corner, and a fourth group of reams of paper disposed in the lower right corner;

at least one of the first group, the second group, the third group, and the fourth group are arranged having an arrangement of reams of paper different from the other groups of reams of paper; and arranging the second layer to comprise the second group of reams of paper disposed in the lower left corner, the first group of reams of paper disposed in the upper left corner, the fourth group of reams of paper disposed in the upper right corner, and the third group of reams of paper disposed in the lower right corner.

14. The method of claim 13, wherein the first group, the second group, the third group, and the fourth group are all arranged different as compared to each other with respect to configuration and/or orientation of the respective reams.

* * * * *